US012566678B2

(12) United States Patent
Sinha et al.

(10) Patent No.: US 12,566,678 B2
(45) Date of Patent: Mar. 3, 2026

(54) ADAPTIVE SERVICE LEVEL AGREEMENT FOR A RECOVERY DATA OBJECTIVE

(71) Applicant: Nutanix, Inc., San Jose, CA (US)

(72) Inventors: Aditya Narain Sinha, Bangalore (IN);
Balram Parmar, Bangalore (IN);
Debayan Bandyopadhyay, Bangalore
(IN); Saravana Selvaraj, Bangalore
(IN)

(73) Assignee: Nutanix, Inc., San Jose, CA (US)

( * ) Notice: Subject to any disclaimer, the term of this
patent is extended or adjusted under 35
U.S.C. 154(b) by 0 days.

(21) Appl. No.: 18/900,591

(22) Filed: Sep. 27, 2024

(65) Prior Publication Data

US 2026/0037391 A1 Feb. 5, 2026

(30) Foreign Application Priority Data

Aug. 1, 2024 (IN) .............................. 202441058406

(51) Int. Cl.
*G06F 11/14* (2006.01)
*G06F 11/1446* (2026.01)
(52) U.S. Cl.
CPC ...... *G06F 11/1469* (2013.01); *G06F 2201/80*
(2013.01)
(58) Field of Classification Search
CPC .......................... G06F 11/1469; G06F 2201/80
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,772,866 B1 | 9/2017 | Aron et al. | |
| 10,977,132 B2 | 4/2021 | Deshpande et al. | |
| 2020/0110675 A1* | 4/2020 | Wang .................. | G06F 11/2028 |
| 2020/0393960 A1* | 12/2020 | Kuchibhotla ........... | G06F 16/11 |
| 2024/0054106 A1 | 2/2024 | Ahn et al. | |

OTHER PUBLICATIONS

Cano, Ignacio, et al. "Curator: Self-Managing Storage for Enter-
prise Clusters" (Mar. 27, 2017), from https://www.usenix.org/
conference/nsdi17/.

(Continued)

*Primary Examiner* — Apu M Mofiz
*Assistant Examiner* — Cindy Nguyen
(74) *Attorney, Agent, or Firm* — Foley & Lardner LLP

(57) ABSTRACT

A method may include, obtaining, by one or more proces-
sors, transaction logs of a database server captured in a
predetermined time period, identifying, by the one or more
processors, a rate of change of data within the transaction
logs, classifying, by the one or more processors, portions of
the time period according to the rate of change of data within
the portions of the time period, and setting, by the one or
more processors, a service level agreement (SLA) for each
portion of the time period according to the classification of
each portion.

26 Claims, 6 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
"Automated backups in Azure SQL ManagedInstance", Jun. 6, 2025, https://learn.microsoft.com/en-us/azure/azure-sql/managed-instance/automated-backups-overview?view=azuresql.
Commvault, "Adding an Automatic Database Log Backup Schedule to a Schedule Policy", updated Apr. 1, 2025, https://documentation.commvault.com/11.20/adding_automatic_database_log_backup_schedule_to_schedule_policy.html.

* cited by examiner

300

| Zone | No. of consecutive 5 minutes periods required to reach/breach RDO of size "S" | SLA |
|------|------|------|
| Low activity | >6 and <=12 | 1 hour |
| Medium activity | >3 and <=6 | 30 min |
| Moderate activity | >1 and <=3 | 15 min |
| Peak activity | <=1 | 5 min |

| Zone | SLA | Hour of the day | Consecutive SLA Repeats |
|---|---|---|---|
| Low activity | 1 hour | 01:00 hr to 06:00 hr | 6 |
| Medium activity | 30 min | 06:30 hr to 08:00 hr | 4 |
| Moderate activity | 15 min | 08:15 hr to 10:00 hr | 8 |
| Peak activity | 5 min | 10:05 hr to 12:00 hr | 24 |
| Medium activity | 30 min | 12:30 hr to 14:00 hr | 4 |
| Peak activity | 5 min | 14:05 hr to 17:00 hr | 36 |
| Moderate activity | 15 min | 17:15 hr to 20:00 hr | 12 |
| Peak activity | 5 min | 20:05 hr to 22:00 hr | 24 |
| Medium activity | 30 min | 22:30 hr to 00:00 hr | 4 |

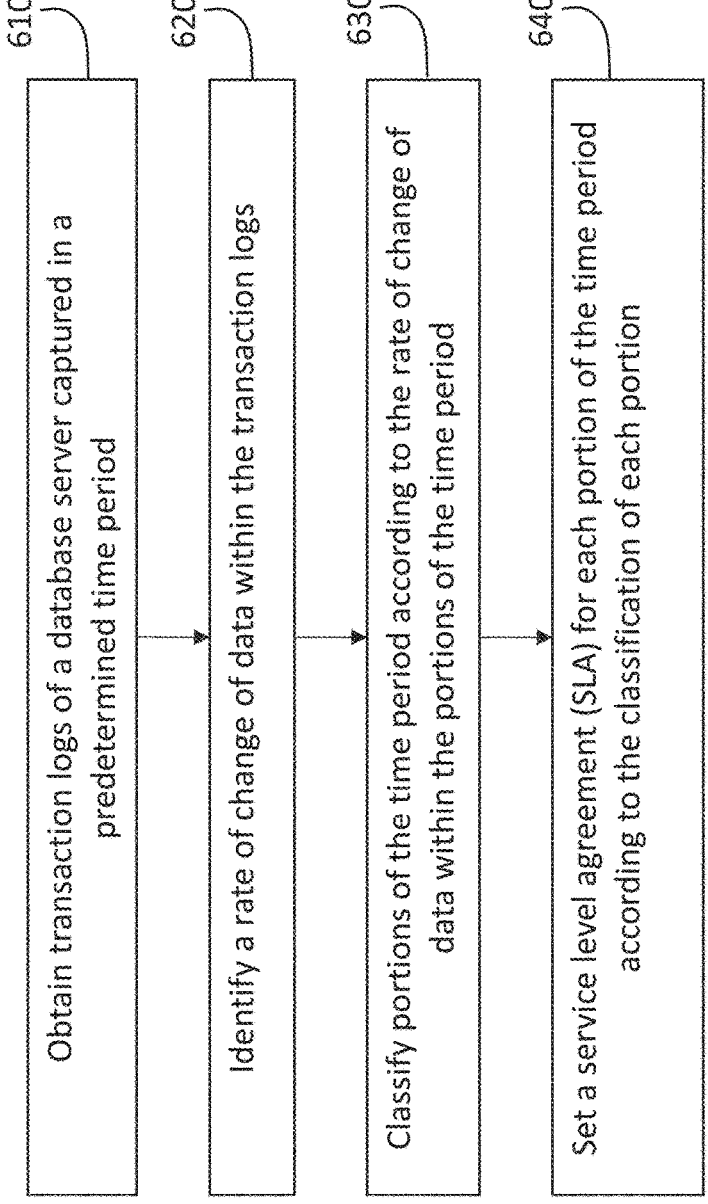

600

610 Obtain transaction logs of a database server captured in a predetermined time period 620 Identify a rate of change of data within the transaction logs 630 Classify portions of the time period according to the rate of change of data within the portions of the time period 640 Set a service level agreement (SLA) for each portion of the time period according to the classification of each portion

FIG. 6

ADAPTIVE SERVICE LEVEL AGREEMENT FOR A RECOVERY DATA OBJECTIVE

CROSS-REFERENCE TO RELATED APPLICATIONS

This application claims priority to Indian Provisional Application No.: 202441058406, filed Aug. 1, 2024, which application is incorporated herein by reference in its entirety.

BACKGROUND

Databases may be backed up to prevent data loss in the event of database failure. Snapshots and transaction logs can be captured at intervals to provide recovery for databases.

BRIEF DESCRIPTION OF THE DRAWINGS

FIG. 4 illustrates a table including example classifications of rates of change of data in transaction logs.

FIG. 5 illustrates an example data structure for adaptive SLAs.

FIG. 6 is a flow diagram illustrating operations of a method for generating a data structure for adaptive SLAs.

DETAILED DESCRIPTION

Figure 1:
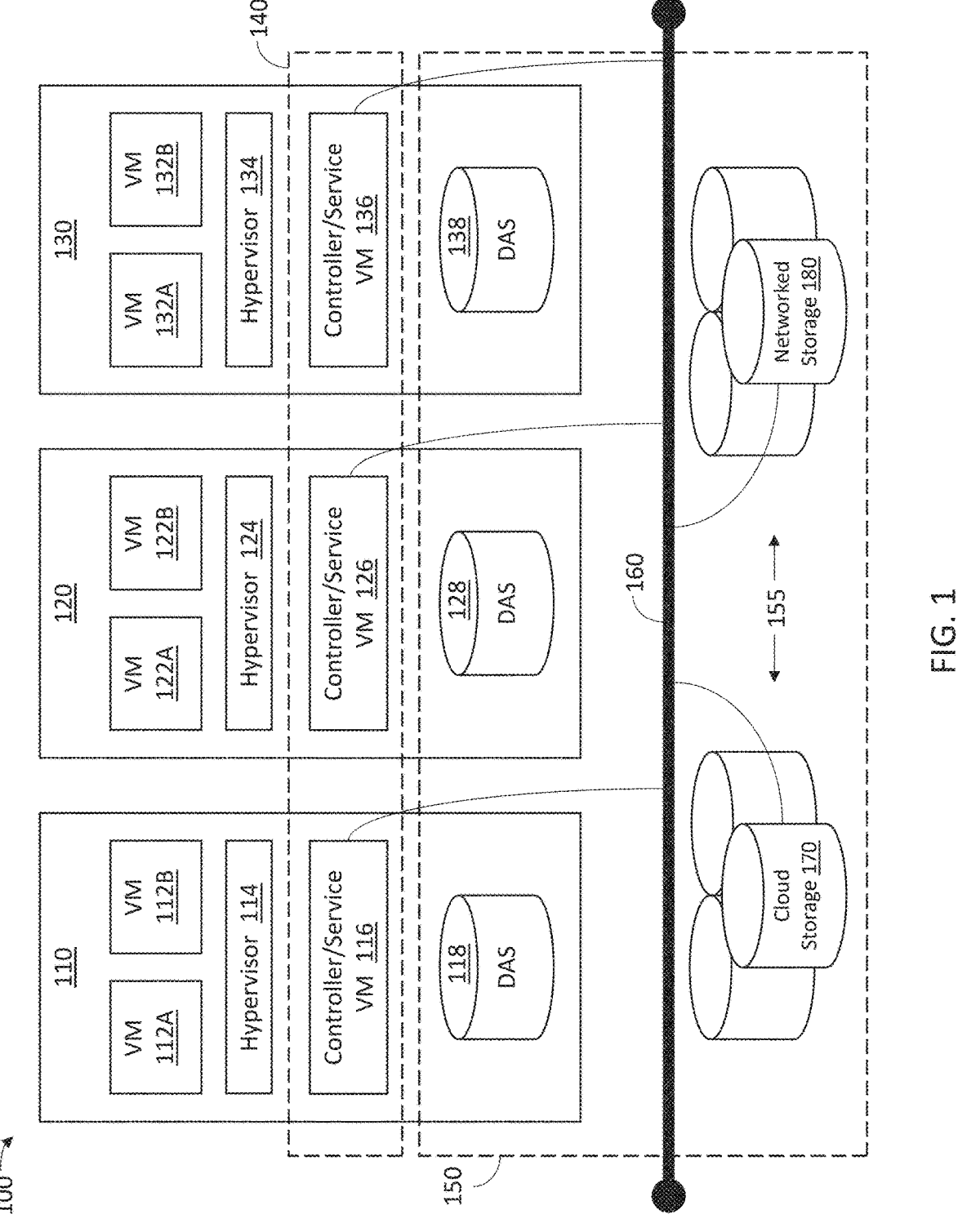
FIG. 1 is a block diagram of an example cluster of a virtual computing system, in accordance with some embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A database can be backed up using snapshots and transaction logs. Schedules for taking snapshots and collecting transaction logs can be defined in a service-level-agreement (SLA). The SLA can be defined by users based on considerations of cost, storage, and potential losses in the event of an outage or failure. Some SLAs include or are based on a recovery point objective (RPO) which defines a point in time to which a system (e.g., VM, database) can be restored. In an example, an RPO of one hour would require taking snapshots and collecting transaction logs to allow a system to be restored to a point in time no earlier than one hour before a failure. In this example, snapshots could be taken every six hours and transaction logs collected every hour. However, the amount of data that is lost after a failure depends upon how much data was changed within a database within the time period that was not covered by a backup. For example, one hour of lost data may be only five MB of data in low usage times but five GB of data in high usage times. This poses a problem for users, as the amount of data that is lost may have a greater impact on an application than an amount of time lost. Embodiments and examples discussed herein address this technical problem by generating a prediction of data change in a database to implement adaptive SLAs. By analyzing the rate of change of data in transaction logs over a time period, predictions of the rate of change of data in transaction logs in a subsequent time period can be determined to generate a schedule of SLAs to be implemented in the subsequent time period. In this way, a user can indicate a maximum amount of data that can be lost using a recovery data objective (RDO). The maximum amount of data that can be lost can be no more than twice the RDO, or twice an amount of data defined by the RDO. The RDO can also indicate the minimum amount of data needed for performing backups, allowing for avoiding overly-frequent backups and reducing a burden on the system. The RDO can be used to generate the schedule of SLAs based on the prediction of the rate of change of data in transaction logs. Additionally, by generating the schedule of SLAs prior to execution of the SLAs, an additional burden on the workload is avoided, as the rate of change of data in the transaction logs does not have to be monitored in real time.

FIG. 1 is a block diagram of an example cluster 100 of a virtual computing system, in accordance with some embodiments of the present disclosure. The cluster 100 may be incorporated in a cloud based implementation, an on-premises implementation, or a combination of both. An on-premises implementation may be a datacenter that is not part of a cloud. In an example, an organization's servers that it owns and controls for its use can be an on-premises implementation. The cluster 100 may be part of a hyperconverged system or any other type of system. The cluster 100 includes a plurality of nodes, such as a first node 110, a second node 120, and a third node 130. Each of the first node 110, the second node 120, and the third node 130 may also be referred to as a "host" or "host machine." The first node 110 includes database virtual machines ("database VMs") 112A and 112B (collectively referred to herein as "database VMs 112"), a hypervisor 114 configured to create and run the database VMs, and a controller/service VM 116 configured to manage, route, and otherwise handle workflow requests between the various nodes of the cluster 100. Similarly, the second node 120 includes database VMs 122A and 122B (collectively referred to herein as "database VMs 122"), a hypervisor 124, and a controller/service VM 126, and the third node 130 includes database VMs 132A and 132B (collectively referred to herein as "database VMs 132"), a hypervisor 134, and a controller/service VM 136. The controller/service VM 116, the controller/service VM 126, and the controller/service VM 136 are all connected to a network 160 to facilitate communication between the first node 110, the second node 120, and the third node 130. Although not shown, in some embodiments, the hypervisor 114, the hypervisor 124, and the hypervisor 134 may also be connected to the network 160. Further, although not shown, one or more of the first node 110, the second node 120, and the third node 130 may include one or more containers managed by a monitor (e.g., container system). In some embodiments, the controller/service VMs 116, 126, and 136 are not included in the cluster 100. The controller/service VMs 116, 126, and 136 may be in a first domain while the VMs 112, 122, and 132 are in a second domain. In an example, the controller/service VMs 116, 126, 136 are in a first cloud, the VMs 112 are in a second cloud, the VMs 122 are in a third cloud, and the VMs 132 are in a fourth cloud. In another example, the controller/service VMs 116, 126, 136 are in a first AWS account and the VMs 112, 122, and 132 are each in different, separate AWS accounts. Thus, the nodes 110, 120, and 130 may be nodes of various public or private clouds, with the controller/service VMs 116, 126, and 136 being separate from the VMs 112, 122, and 132. In an example, the controller/service VMs 116, 126, and 136 host a distributed control plane for managing the VMs 112, 122, and 132, where the VMs 112, 122, and 132 are database server VMs in public cloud accounts separate from a cloud account associated with the control plane.

The controller/service VMs 116, 126, and 136 can be considered a control plane and the VMs 112, 122, and 132 can be considered a data plane. The data plane may include data which is separate from the control logic executed on the control plane. VMs may be added to or removed from the data plane. As discussed above, the control plane and the data plane may be in separate cloud accounts. Different VMs in the data plane may be in separate cloud accounts. In an example, the control plane is in a cloud account of a database management platform provider and the data plane is in cloud accounts of customers of the database management platform provider.

The cluster 100 also includes and/or is associated with a storage pool 150 (also referred to herein as storage subsystem). The storage pool 150 may include network-attached storage 155 and direct-attached storage 118, 128, and 138. The network-attached storage 155 is accessible via the network 160 and, in some embodiments, may include cloud storage 170, as well as a networked storage 180. In contrast to the network-attached storage 155, which is accessible via the network 160, the direct-attached storage 118, 128, and 138 includes storage components that are provided internally within each of the first node 110, the second node 120, and the third node 130, respectively, such that each of the first, second, and third nodes 110, 120, 130 may access its respective direct-attached storage without having to access the network 160.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 110, the second node 120, and the third node 130) are shown in the cluster 100, in other embodiments, greater than or fewer than three nodes may be provided within the cluster 100. Likewise, although only two database VMs (e.g., the database VMs 112, the database VMs 122, the database VMs 132) are shown on each of the first node 110, the second node 120, and the third node 130, in other embodiments, the number of the database VMs on each of the first, second, and third nodes 110, 120, 130 may vary to include other numbers of database VMs. Further, the first node 110, the second node 120, and the third node 130 may have the same number of database VMs (e.g., the database VMs 112, the database VMs 122, the database VMs 132) or different number of database VMs.

In some embodiments, each of the first node 110, the second node 120, and the third node 130 may include a hardware device, such as a server. For example, in some embodiments, one or more of the first node 110, the second node 120, and the third node 130 may include a server computer provided by Nutanix, Inc., Dell, Inc., Lenovo Group Ltd. or Lenovo PC International, Cisco Systems, Inc., etc. In other embodiments, one or more of the first node 110, the second node 120, or the third node 130 may include another type of hardware device, such as a personal computer, an input/output or peripheral unit such as a printer, or any type of device that is suitable for use in a node within the cluster 100. In some embodiments, the cluster 100 may be part of one or more data centers. Further, one or more of the first node 110, the second node 120, and the third node 130 may be organized in a variety of network topologies. Each of the first node 110, the second node 120, and the third node 130 may also be configured to communicate and share resources with each other via the network 160. For example, in some embodiments, the first node 110, the second node 120, and the third node 130 may communicate and share resources with each other via the controller/service VM 116, the controller/service VM 126, and the controller/service VM 136, and/or the hypervisor 114, the hypervisor 124, and the hypervisor 134.

Also, although not shown, one or more of the first node 110, the second node 120, and the third node 130 may include one or more processing units configured to execute instructions. The instructions may be carried out by a special purpose computer, logic circuits, or hardware circuits of the first node 110, the second node 120, and the third node 130. The processing units may be implemented in hardware, firmware, software, or any combination thereof. The term "execution" is, for example, the process of running an application or the carrying out of the operation called for by an instruction. The instructions may be written using one or more programming languages, scripting languages, assembly language, etc. The processing units, thus, execute an instruction, meaning that they perform the operations called for by that instruction.

The processing units may be operably coupled to the storage pool 150, as well as with other elements of the first node 110, the second node 120, and the third node 130 to receive, send, and process information, and to control the operations of the underlying first, second, or third node 110, 120, 130. The processing units may retrieve a set of instructions from the storage pool 150, such as, from a permanent memory device like a read only memory ("ROM") device and copy the instructions in an executable form to a temporary memory device that is generally some form of random access memory ("RAM"). The ROM and RAM may both be part of the storage pool 150, or in some embodiments, may be separately provisioned from the storage pool 150. In some embodiments, the processing units may execute instructions without first copying the instructions to the RAM. Further, the processing units may include a single stand-alone processing unit, or a plurality of processing units that use the same or different processing technology.

With respect to the storage pool 150 and particularly with respect to the direct-attached storage 118, 128, and 138, each of the direct-attached storage 118, 128, 138 may include a variety of types of memory devices that are suitable for a virtual computing system. For example, in some embodiments, one or more of the direct-attached storage 118, 128, and 138 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 155 may include any of a variety of network accessible storage (e.g., the cloud storage 170, the networked storage 180, etc.) that is suitable for use within the cluster 100 and accessible via the network 160. The storage pool 150, including the network-attached storage 155 and the direct-attached storage 118, 128, and 138, together form a distributed storage system configured to be accessed by each of the first node 110, the second node 120, and the third node 130 via the network 160, the controller/service VM 116, the controller/service VM 126, the controller/service VM 136, and/or the hypervisor 114, the hypervisor 124, and the hypervisor 134. In some embodiments, the various storage components in the storage pool 150 may be configured as virtual disks for access by the database VMs 112, the database VMs 122, and the database VMs 132.

Each of the database VMs 112, the database VMs 122, the database VMs 132 is a software-based implementation of a computing machine. The database VMs 112, the database VMs 122, the database VMs 132 emulate the functionality of a physical computer. Specifically, the hardware resources, such as processing unit, memory, storage, etc., of the underlying computer (e.g., the first node 110, the second node 120, and the third node 130) are virtualized or transformed by the respective hypervisor 114, the hypervisor 124, and the hypervisor 134, into the underlying support for each of the database VMs 112, the database VMs 122, the database VMs 132 that may run its own operating system and applications on the underlying physical resources just like a real computer. By encapsulating an entire machine, including CPU, memory, operating system, storage devices, and network devices, the database VMs 112, the database VMs 122, the database VMs 132 are compatible with most standard operating systems (e.g. Windows, Linux, etc.), applications, and device drivers.

Thus, each of the hypervisor 114, the hypervisor 124, and the hypervisor 134 is a virtual machine monitor that allows a single physical server computer (e.g., the first node 110, the second node 120, third node 130) to run multiple instances of the database VMs 112, the database VMs 122, and the database VMs 132 with each VM sharing the resources of that one physical server computer, potentially across multiple environments. For example, each of the hypervisor 114, the hypervisor 124, and the hypervisor 134 may allocate memory and other resources to the underlying VMs (e.g., the database VMs 112, the database VMs 122, the database VM 132A, and the database VM 132B) from the storage pool 150 to perform one or more functions.

By running the database VMs 112, the database VMs 122, and the database VMs 132 on each of the first node 110, the second node 120, and the third node 130, respectively, multiple workloads and multiple operating systems may be run on a single piece of underlying hardware computer (e.g., the first node 110, the second node 120, and the third node 130) to increase resource utilization and manage workflow. When new database VMs are created (e.g., installed) on the first node 110, the second node 120, and the third node 130, each of the new database VMs may be configured to be associated with certain hardware resources, software resources, storage resources, and other resources within cluster 100 to allow those virtual VMs to operate as intended.

The database VMs 112, the database VMs 122, the database VMs 132, and any newly created instances of the database VMs may be controlled and managed by their respective instance of the controller/service VM 116, the controller/service VM 126, and the controller/service VM 136. The controller/service VM 116, the controller/service VM 126, and the controller/service VM 136 are configured to communicate with each other via the network 160 to form a distributed system 140. Each of the controller/service VM 116, the controller/service VM 126, and the controller/service VM 136 may be considered a local management system configured to manage various tasks and operations within the cluster 100. For example, in some embodiments, the local management system may perform various management related tasks on the database VMs 112, the database VMs 122, and the database VMs 132.

The hypervisor 114, the hypervisor 124, and the hypervisor 134 of the first node 110, the second node 120, and the third node 130, respectively, may be configured to run virtualization software, such as, ESXi from VMWare, AHV from Nutanix, Inc., XenServer from Citrix Systems, Inc., etc. The virtualization software on the hypervisor 114, the hypervisor 124, and the hypervisor 134 may be configured for running the database VMs 112, the database VMs 122, the database VM 132A, and the database VM 132B, respectively, and for managing the interactions between those VMs and the underlying hardware of the first node 110, the second node 120, and the third node 130. Each of the controller/service VM 116, the controller/service VM 126, the controller/service VM 136, the hypervisor 114, the hypervisor 124, and the hypervisor 134 may be configured as suitable for use within the cluster 100.

The network 160 may include any of a variety of wired or wireless network channels that may be suitable for use within the cluster 100. For example, in some embodiments, the network 160 may include wired connections, such as an Ethernet connection, one or more twisted pair wires, coaxial cables, fiber optic cables, etc. In other embodiments, the network 160 may include wireless connections, such as microwaves, infrared waves, radio waves, spread spectrum technologies, satellites, etc. The network 160 may also be configured to communicate with another device using cellular networks, local area networks, wide area networks, the Internet, etc. In some embodiments, the network 160 may include a combination of wired and wireless communications. The network 160 may also include or be associated with network interfaces, switches, routers, network cards, and/or other hardware, software, and/or firmware components that may be needed or considered desirable to have in facilitating intercommunication within the cluster 100.

Referring still to FIG. 1, in some embodiments, one of the first node 110, the second node 120, or the third node 130 may be configured as a leader node. The leader node may be configured to monitor and handle requests from other nodes in the cluster 100. For example, a particular database VM (e.g., the database VMs 112, the database VMs 122, or the database VMs 132) may direct an input/output request to the controller/service VM (e.g., the controller/service VM 116, the controller/service VM 126, or the controller/service VM 136, respectively) on the underlying node (e.g., the first node 110, the second node 120, or the third node 130, respectively). Upon receiving the input/output request, that controller/service VM may direct the input/output request to the controller/service VM (e.g., one of the controller/service VM 116, the controller/service VM 126, or the controller/service VM 136) of the leader node. In some cases, the controller/service VM that receives the input/output request may itself be on the leader node, in which case, the controller/service VM does not transfer the request, but rather handles the request itself.

The controller/service VM of the leader node may fulfill the input/output request (and/or request another component within/outside the cluster 100 to fulfill that request). Upon fulfilling the input/output request, the controller/service VM of the leader node may send a response back to the controller/service VM of the node from which the request was received, which in turn may pass the response to the database VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 may be associated with a central management system that is configured to manage and control the operation of multiple clusters in the virtual computing system. In some embodiments, the central management system may be configured to communicate with the local management systems on each of the controller/service VM 116, the controller/service VM 126, the controller/service VM 136 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein. For example, in some embodiments, the VMs 112, 122, and 132 are not in the same nodes as the controller/service VMs 116, 126 134. The VMs 112, 122, and 132 may be located in a different cloud than the controller/service VMs 116, 126 134.

For simplicity of description, various implementations and examples are described as involving, or using clusters, such as the cluster 100. However, similar description applies equally well to implementations and examples where agents, applications, and/or databases are hosted on individual servers, machines, computers, or the like. For example, an SLA can be applied to entities (e.g., database servers, databases) hosted on individual servers or machines, on clusters, or any combination thereof.

Figure 2:
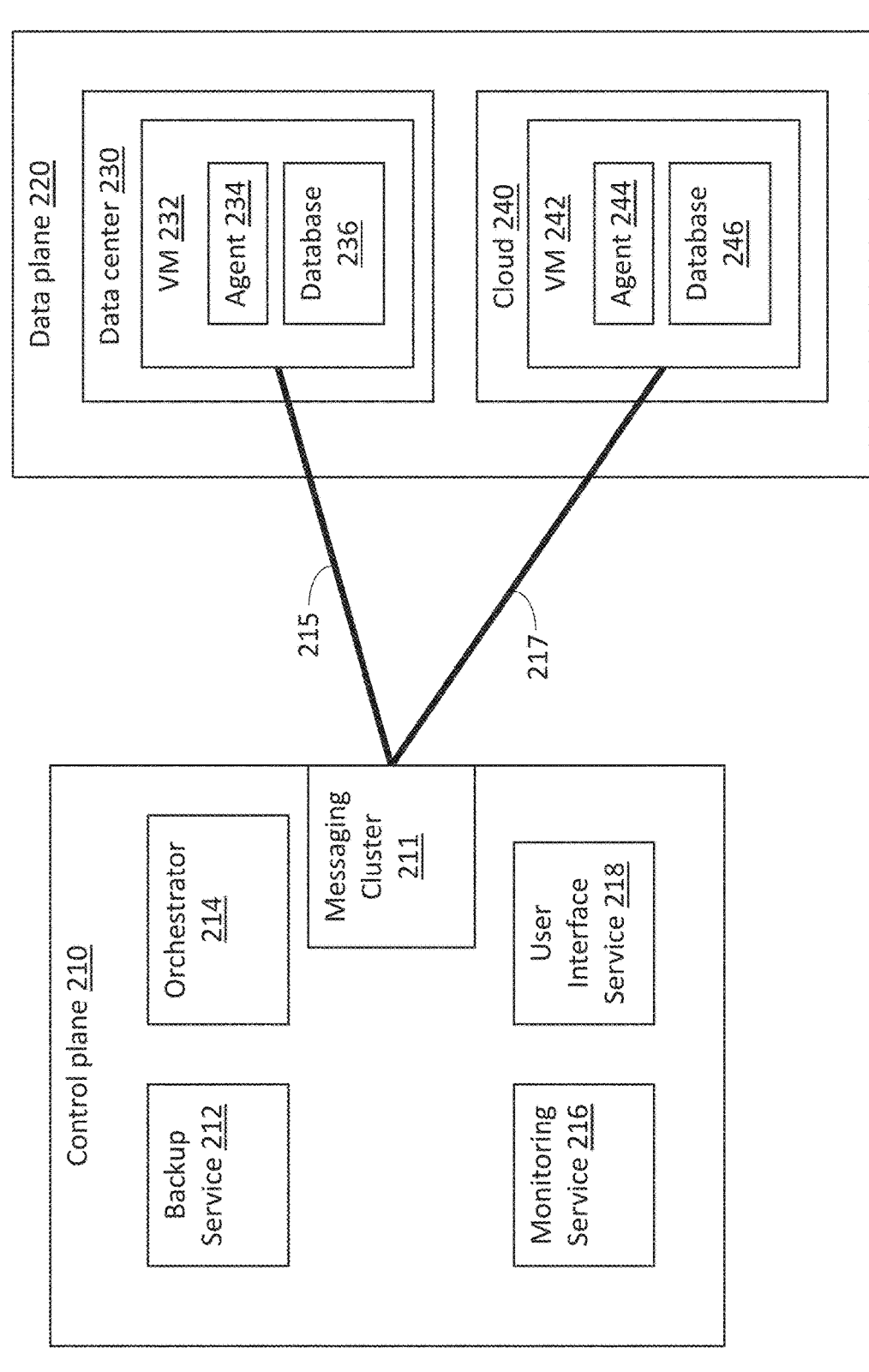
FIG. 2 is a block diagram of an example database management system, in accordance with some embodiments of the present disclosure.

FIG. 2 is a block diagram of an example database management system 200, in accordance with some embodiments of the present disclosure. The database management system 200 may be implemented using one or more clusters, such as the cluster 100 of FIG. 1. In some implementations, one or more components of the database management system 200 are implemented as clusters.

The database management system 200 includes a control plane 210 and a data plane 220. The control plane 210 manages database operations of databases on the data plane 220. The data plane 220 may include databases and virtual machines across multiple different geographies, data centers, public clouds and/or private clouds. Thus, the control plane 210 may manage database operations across multiple different geographies, data centers, public clouds and/or private clouds. The control plane 210 may provide hybrid cloud database management services for databases having instances both on-premises and in public clouds. The control plane 210 may include one or more processors and a memory including computer-readable instructions which cause the one or more processors to perform operations described herein.

The data plane 220 includes a first VM 232 and a second VM 242. The first VM 232 may be hosted in a data center 230. The second VM 242 may be hosted on a cloud 240 such as a public or private cloud and be associated with a cloud account. The first VM 232 includes a first agent 234 of the control plane 210 and a first database 236. The first agent 234 receives commands and operations from the control plane 210 and transmits information to the control plane 210 to provide database management services for the first database 236. The second VM 242 includes a second agent 244 of the control plane 210 and a second database 246. The second agent 244 receives commands and operations from the control plane 210 and transmits information to the control plane 210 to provide database management services for the second database 246.

While the data plane 220 is illustrated as including the first VM 232 hosted in the data center 230 and the second VM 242 hosted on the cloud 240, the data plane 220 may manage database operations of (e.g., send commands to) a plurality of VMs hosted across multiple public clouds, private clouds, and/or on-premises systems. Similarly, the data center 230 may host a plurality of VMs and may include one or more on-premises systems and/or components of a public cloud or private cloud. The control plane 210 may be able to manage database operations of the plurality of VMs across the multiple public clouds, private clouds, and/or on-premises systems by sending commands, modified based on the hosting location, to the plurality of VMs. In this way, the control plane 210 provides a unified user interface for managing VMs in a hybrid cloud environment spanning on-premises systems, public clouds, and private clouds.

The first and second VMs 232, 242 may be termed "database servers," as they serve as virtual database servers for hosting the first and second databases 236, 246. The first and second VMs 232, 242 may be hosted on clusters of nodes, such as the cluster 100 of FIG. 1.

The first agent 234 sends and receives messages from the control plane 210 over a first single communication channel 215. The second agent 244 sends and receives messages from the control plane 210 over a second single communication channel 217. Each of the first and second single communication channels 215, 217 may be single transmission control protocol (TCP) connections. In this way, the control plane 210 is able to open only a single communication channel for each agent associated with each database. Although two VMs are illustrated, the control plane 210 may provide database management services for hundreds, thousands, or millions of VMs. With hundreds of VMs, limiting the number of connections between the control plane 210 and each VM conserves a large amount of compute and network resources.

The control plane 210 includes a messaging cluster 211. The messaging cluster 211 may be a cluster of nodes such as the cluster 100 of FIG. 1 executing a messaging service or messaging application. The messaging cluster 211 may receive messages from the first agent 234 over the first single communication channel 215 and messages from the second agent 244 over the second single communication channel 217. The messaging cluster 211 may isolate messages between different VMs. In an example, the messaging cluster 211 monitors tags, ids, or other indications of origin of the messages to determine that messages from the first agent 234 are received on the first single communication channel 215. In this example, if a message received on the first single communication channel 215 includes an identifier indicating the message originated at a different VM, the message is dropped. Similarly, if a message including an identifier of the first VM 232 is received on the second single communication channel 217 or any other communication channel besides the first single communication channel 215, the message is dropped.

The messaging cluster 211 may direct messages from the first and second VMs 232, 242 to various components of the control plane 210 based on characteristics of the control plane 210. The messaging cluster 211 may include different topics for sending and receiving messages on the first and second single communication channels 215, 217. In an example, the messaging cluster 211 may route messages in an operations topic, a requests topic, and a commands topic.

The control plane 210 includes an orchestrator 214 to orchestrate database management services. In some implementations, the orchestrator 214 may be implemented as a service or container, or containerized service. A container is a self-sufficient software package that includes all elements for implementing an operating system or other program. In an example, a service is a containerized service that includes all elements for implementing an operating service, allowing the service to be deployed to almost any environment. Similarly, other components of the control plane 210 may be implemented as services or containers. The orchestrator 214 may receive database management service requests from other components of the control plane 210. The orchestrator 214 generates operations and sends the operations and/or commands associated with the operations to the messaging cluster 211. In an example, the orchestrator 214 receives a clone database request for the first VM 232, generates a clone database operation, and sends commands for generating a clone database for the first VM 232 to the messaging cluster 211 for sending to the first agent 234 using the first single communication channel 215. In an example, the orchestrator 214 receives a log backup request (e.g., form a log backup service 212) to back up transaction logs of the first VM 232, generates a log backup operation, and sends commands for backing up the transaction logs of the first VM 232 to the messaging cluster 211 for sending to the first agent 234 using the first single communication channel 215.

The control plane 210 includes a backup service 212. The backup service 212 may determine when to generate backups of the first and second VMs 232, 242, when to generate clone databases for the first and second databases 236, 246, and/or when to capture transaction logs for the first and second databases 236, 246. The backup service 212 may determine when to generate backups, clone databases, and/or or capture transaction logs based on service level agreements (SLAs). In an example, a first SLA for the first VM 232 may cause the backup service 212 to generate and send a backup request for the first VM 232 to the orchestrator 214 every day. In an example, a second SLA for the second VM 242 may cause the backup service 212 to generate and send a backup request for the second VM 242 to the orchestrator 214 every day.

As used herein, backing up, capturing, and collecting transaction logs may each refer to retrieving, by control plane 210, transaction logs of a database. The control plane 210, or the backup service 212 of the control plane 210 may retrieve transaction logs from the first VM 232. The first agent 234 may periodically retrieve logs from the first database 236 and place them in a staging location. The first agent 234 may transmit the transaction logs to the control plane 210 or to another location from the staging location when requested by the control plane 210. In an example, a database backup entity executed on the control plane 210 initiates a log collection operation which causes the first agent 234 to transmit the transaction logs from the staging location to a backup location associated with the database backup entity. In this way, periodic backups of the transaction logs of the database 236 are stored at the control plane 210 or another location for recovery in the event of an outage or failure of the first VM 232. The time needed for collecting transaction logs depends on the size of the transaction logs, where larger transaction logs (corresponding to larger changes to the database) take longer to collect.

In some implementations, the backup service 212 determines an SLA, or schedule of SLAs based on user input. In an example, a user defines a recovery point objective (RPO) of thirty minutes, causing the backup service 212 to take snapshots of the first VM 232 every thirty minutes to allow for recovery of the VM 232 at thirty-minute intervals. In an example, a user defines an RPO of thirty minutes, causing the backup service 212 to take snapshots of the first VM 232 every two hours and backup transaction logs of the first VM 232 every thirty minutes to allow for recovery of the VM 232 at thirty-minute intervals. By taking snapshots and capturing (e.g., backing up) transaction logs, the backup service 212 can provide point-in-time recovery (PITR). The backup service 212 can recover the first VM 232 by creating a clone of the first VM 232 from a snapshot of the first VM 232 and then applying transaction logs of the first VM 232 to progress the clone of the first VM 232 forward in time to a point in time at which recovery is requested.

In some implementations, the backup service 212 determines an SLA, or schedule of SLAs based on user input that specifies recovery parameters in terms of data, such as a recovery data objective (RDO). While an RPO indicates how much time is tolerated between backups, reflecting a window of time within which data can be lost, an RDO indicates how much data is tolerated between backups, reflecting an amount of data which can be lost. By providing input that specifies recovery parameters in terms of data, such as an RDO, a user can avoid trying to guess how much data might be lost within a time interval. As the amount of data that will be changed within a future time interval is not known, the backup service 212 can predict how much data will be changed based on historical rates of change of data. As discussed herein, the backup service 212 can analyze transaction logs of the first VM 232 to determine a rate of change of data in the transaction logs within a time period, classify different portions of the time period based on the rate of change of data, set an SLA for the different portions of the time period based on the classifications, and execute the SLAs during the corresponding portions of a subsequent time period.

In an example, the backup service 212 analyzes transaction logs of the VM 232 captured over one hundred hours and determines that the first forty hours have a first rate of change of data in the first VM 232 reflected in the transaction logs, the next fifty hours have a second, higher rate of change of data in the first VM 232 reflected in the transaction logs, and the last ten hours have a third, lowest rate of change of data in the first VM 232 reflected in the transaction logs. In this example, the backup service 212 sets a first SLA having a first log backup frequency for the first forty hours, a second SLA having a second, higher, log backup frequency for the next fifty hours, and a third, lowest, log backup frequency for the last ten hours. In this example, the backup service 212 generates an SLA data structure including the first SLA, the second SLA, and the third SLA and their respective times and executes the SLAs in the SLA data structure in a subsequent one hundred hours. As discussed herein, executing the SLA data structure and the included SLAs can include sending the SLA data structure to the first agent 234. During the subsequent one hundred hours, the first agent 234 takes snapshots of the first VM 232 and captures the transaction logs of the first VM 232 according to the SLAs in the SLA data structure. In this way, the SLAs can be automatically executed based on the pre-generated SLA data structure without imposing additional burden on the first VM 232.

In an example, the backup service 212 analyzes transaction logs of the VM 232 captured over one week and determines that Monday mornings have a first rate of change of data in the first VM 232 reflected in the transaction logs, weekday afternoons have a second, higher rate of change of data in the first VM 232 reflected in the transaction logs, and Friday evening through Sunday night has a third, lowest rate of change of data in the first VM 232 reflected in the transaction logs. In this example, the backup service 212 sets a first SLA having a first log backup frequency for Monday mornings, a second SLA having a second, higher, log backup frequency for weekday afternoons, and a third, lowest, log backup frequency for Friday evening through Sunday night. In this example, the backup service 212 generates an SLA data structure including the first SLA, the second SLA, and the third SLA and their respective times and executes the SLAs in the SLA data structure in a subsequent week. As discussed herein, executing the SLA data structure and the included SLAs can include sending the SLA data structure to the first agent 234. During the subsequent week, the first agent 234 takes snapshots of the first VM 232 and captures the transaction logs of the first VM 232 according to the SLAs in the SLA data structure. In this way, the SLAs can be automatically executed based on the pre-generated SLA data structure without imposing additional burden on the first VM 232.

Any time period can be used for analyzing the transaction logs and generating the SLA data structure. Any time period which displays some sort of cyclical activity in the transaction logs can be used to predict future activity in subsequent time periods. In an example, a time period of a day may be used to predict activity in subsequent days if activity over a day follows a pattern. In an example, a time period of a week may be used to predict activity in subsequent weeks if activity over a week follows a pattern. In an example, a time period of a year may be used to predict activity in subsequent years if activity over a year follows a pattern.

The control plane may include a monitoring service 216. The monitoring service 216 may monitor a status of the first database 236 and/or a status of the second database 246. In some implementations, the second database 246 is a backup database of the first database 236 and the monitoring service 216 monitors the status of the first database 236 in order to determine when to recover the first database 236 using the second database 246 or to perform a failover to the second database 246. The monitoring service 216 may monitor the status of the first database 236 and/or the status of the second database 246 by monitoring messages between the control plane 210 and the first and second databases 236, 246. In an example, if the control plane 210 sends a message to the first database 236 and a response is not received within a predetermined time period, the monitoring service 216 determines that the first database 236 is not available.

In some implementations, the backup service 212 includes backup service entities, or instances on the control plane 210 that are created each time a database is provisioned. Each backup service entity is associated with a database and manages all database management tasks for the associated database. The backup service entity may be a logic construct that handles all data management aspects for the associated database. The backup service entity can be referred to as a "time machine." The backup service entity can handle the creation of backups for the database, the creation of snapshots, and the capture of logs. In some implementations, the backup service entity defines a service level agreement (SLA) or ingests an SLA to be applied to the database. The backup service entity can provide point-in-time recovery (PITR) for the database using the captured snapshots and logs. In an example, a user indicates, using the user interface service 218 that the database is to be restored to a particular point in time, and the backup service entity applies a corresponding snapshot and logs to the database to restore the database to the particular point in time. The backup service entity allows for management of data of the database, providing for users to export some or all of the data of the database (e.g., schema, tables, rows). The backup service entity can communicate with (e.g., send and receive messages) the corresponding agent executing on the database for managing data and backups of the database. The backup service entity can have a storage location on the control plane 210 for storing snapshots and transaction logs of the database. In an example, the backup service initiates snapshot operations and log collection operations, receives snapshots or transaction logs, respectively, in response to the operations, and stores the snapshots or transaction logs in its associated storage location.

The database entity can provide metadata management, allowing applications to use the database as a dedicated metadata store. The backup service entity can detect sensitive data in the database. In some implementations, the backup service entity can obscure or mask the sensitive data. The backup service entity may allow for users to specify who can access the database (e.g., access policy). The backup service entity can allow users to set data pipelines, such as data lakes. In an example, the backup service entity performs data processing on data in the database, or orchestrates data processing of the data in the database to send the data to a data store (e.g., data lake, data warehouse). In some implementations, the backup service entity provides data analytics corresponding to usage of the data in the database, an amount of data in the database, changes to the data in the database, and other information.

The control plane 210 includes a user interface service 218. The user interface service 218 provides a user interface for a user of the control plane 210. The user interface service 218 may expose data of the control plane 210 to the user via the user interface. The user interface service 218 may expose only data associated with the user to the user. The user interface service 218 displays which backups and/or clones are available for recovery. The user interface service 218 receives user input, such as a selection of a backup for recovery, a selection of an SLA for a VM, an indication of an RPO, and/or an indication of an RDO.

The control plane 210 may include additional components not illustrated. Only the illustrated components are included for clarity. In some implementations, multiple instances of the control plane 210 may be implemented in order to provide database management services to additional virtual machines or databases. In some implementations, the components of the control plane 210 may be services which may be implemented in multiple instances. In this way, the control plane 210 is highly scalable to provide database management services to additional VMs.

Figure 3:
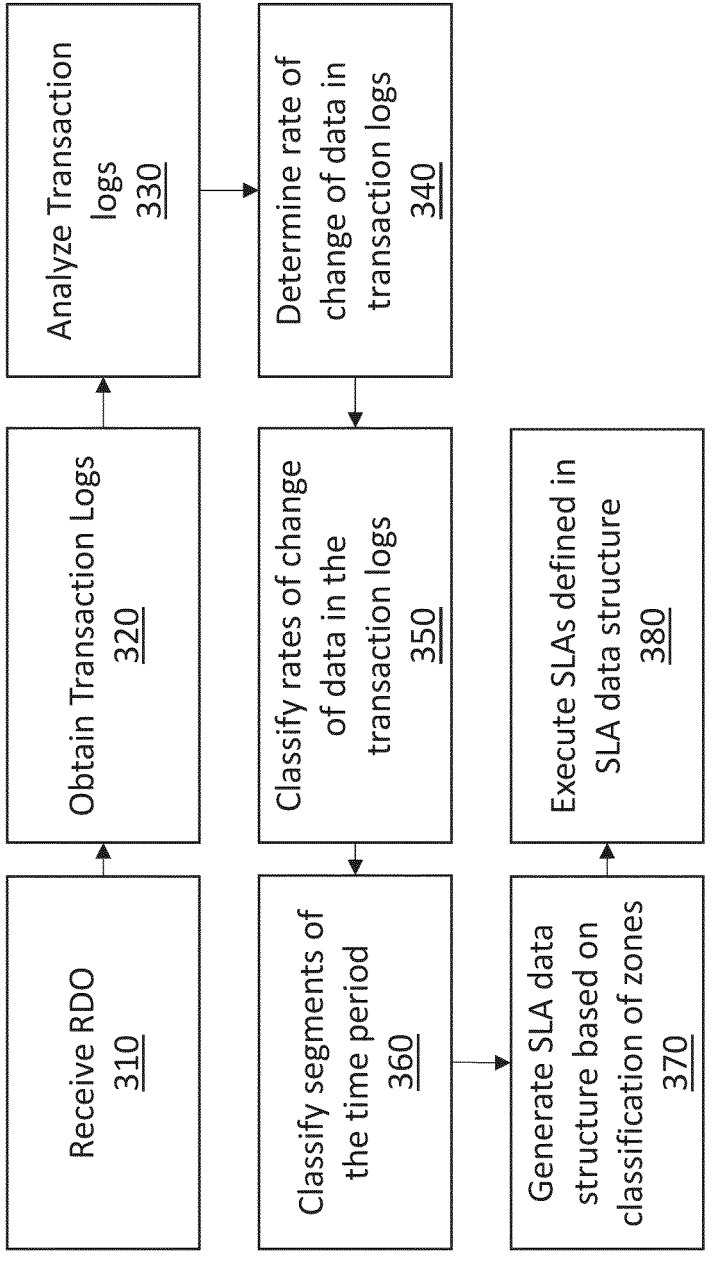
FIG. 3 is a flow diagram illustrating operations of a method for generating and implementing a data structure for adaptive SLAs.

FIG. 3 is a flow diagram illustrating operations of a method 300 for generating and implementing a data structure for adaptive SLAs. The method 300 may include more, fewer, or different operations than illustrated. The operations may be performed in the order shown, in a different order, and/or concurrently. The method 300 may be performed by the database management system 200 of FIG. 2. The method 300 may be performed by the control plane 210 and/or the backup service 212 of FIG. 2.

At operation 310, an RDO is received. As discussed herein, an RDO defines a recovery data objective, an objective for recovery from an outage or failure defined in terms of data. The RDO may define an acceptable limit of data that can be lost in the event of an outage or failure. The RDO can also define a minimum amount of data for backup, such as a log collection operation. A user may select the RDO based on application needs, cost considerations, and other factors. A lower RDO, corresponding to less data lost in the event of an outage or failure, may correspond to increased costs for creating and storing backups. The RDO may be applied to a plurality of entities, such as VMs and/or containers. In an example, the RDO is applied to a plurality of entities managed by the control plane 210 of FIG. 2 associated with the user.

At operation 320, transaction logs are obtained. The transaction logs can be obtained by capturing transaction logs and/or backing up transaction logs during a first time period. The transaction logs can be captured according to an initial or default SLA. In an example, the transaction logs are captured over the course of a week every sixty minutes, according to an initial SLA. The transaction logs may reflect transactions, or changes to a database, allowing for the database to be restored to a specific point in time using a snapshot of the database and the transaction logs and applying the transaction logs to the snapshot of the database. In an example, a snapshot of a database is taken at noon and transaction logs are captured at 1:00, 2:00, and 3:00. In order to restore the database to its state at 2:15, the snapshot of the database taken at noon is used to create a clone of the database, and then the transaction logs for transactions that occurred up to 2:15 are applied to the clone of the database. However, in this example, if the database failed at 3:45, the database could only be restored up to 3:00, when the transaction logs were last captured, causing data from 3:00 to 3:45 to be lost. The amount of data lost depends on how much data was changed from 3:00 to 3:45.

At operation 330, the transaction logs are analyzed to determine when transactions (database transactions) took place and how much data was changed with each transaction. The timing and size of transactions vary according to database usage. In an example, a first transaction at 1:21 pm changes 5 MB of data in a database while a second transaction at 3:45 pm changes 1 KB of data in the database. Analyzing the transaction logs may include correlating times of transactions with sizes of transactions, or amounts of data changed in the transactions. In some implementations, analyzing the transaction logs includes analyzing a data structure indicating the times of transactions and the size of the transactions. In some implementations, analyzing the transaction logs includes creating a data structure indicating the times of transactions and the size of the transactions.

In some implementations, analyzing the transaction logs includes determining a start time and an end time for each transaction log collection operation. The transaction log collection operations may vary in time based on the amount of data being transferred, which depends on the amount of data changed in the database which is reflected in the transaction logs. In some implementations, if large amounts of data are changed in the database between consecutive log collection operations, log collection operations may be delayed until previous log collection operations are completed. In an example, during peak activity hours for an application using a database, an end time of a first log collection operation may be after a scheduled start time of a second log collection operation due to an amount of data transferred in the first log collection operation. In this example, the delay of the second log collection operation may cause a violation of an RPO for the database, as a failure of the database before the delayed end time of the second log collection operation would cause transaction logs of the database to be lost that should have been collected during the scheduled time of the second log collection operation.

At operation 340, the rate of change of data in the transaction logs is determined. The rate of change of data in the transaction logs can be determined over portions of the time period. In some implementations, the rate of change in the transaction logs is determined in terms of data per unit of time. In an example, the rate of change in the transaction logs is determine in terms of MBs per minute, or bytes per second. In some implementations, the rate of change of data in the transaction logs is determined in terms of RDO per time interval. The rate of change of data in the transaction logs may be determined in terms of number of times a size of an RDO is met or exceeded within a predetermined time interval. In an example, the RDO is five MB, and an amount of data changed in the transaction logs is calculated in five minute intervals (i.e., the predetermined time interval is five minutes). In this example, the rate of change of data in the transaction logs is determined in terms of a number of five minute intervals required to reach or exceed the RDO. In this way, the rate of change of data in the transaction logs is determined in terms of amounts of data reaching or exceeding the minimum amount for a backup operation (i.e., the RDO) such as a transaction log collection operation, while allowing for analysis to ensure that the RDO is complied with (i.e., that the maximum amount of data that can be lost under the RDO is not exceeded), Various different approaches for measuring and calculating the rate of change of data in the transaction logs are contemplated.

At operation 350, rates of change of data in the transaction logs are classified. The classifications of the rates of change of data in the transaction logs may be referred to as "zones" of activity. In an example, a first rate of change of data in the transaction logs can be classified as "low activity," a second, higher, rate of change of data in the transaction logs can be classified as "medium activity," a third, higher, rate of change of data in the transaction logs can be classified as "moderate activity," and a fourth, higher, rate of change of data in the transaction logs can be classified as "peak activity." In some implementations, the rates of change of data in the transaction logs can be classified based on one or more thresholds. The one or more thresholds can correspond to one or more SLAs, or frequencies of log collection operations. In some implementations, the rates of change of data in the transaction logs can be classified according to SLAs that would cause successful compliance with the RDO. The rates of change of data in the transaction logs can be classified based on a frequency of log collections operations. In some implementations, a classification of a rate of change of data in the transaction logs corresponds to a frequency of log collections operations (i.e., as defined in an SLA) based on the frequency of log collections operations causing log collection operations to be executed when an amount of data to be collected is greater than the RDO and less than twice the RDO, such that an amount of data that can be lost between the log collections operations is less than or equal to twice the RDO. In an example, a rate of change of data in the transaction logs that causes the RDO to be met within fifteen to thirty minutes may be classified as corresponding to an SLA where transaction log collections operations occur every thirty minutes, as collecting transaction logs every thirty minutes would keep the amount of data lost between transaction log collection operations to be below twice the RDO when the amount of data of the RDO is changed within thirty minutes. An example of classifications of rates of change of data in transaction logs is illustrated in FIG. 4.

At operation 360, portions of the time period are classified based on the classified rates of change of data in the transaction logs. The portions of the time period can be contiguous portions of the time period having a similar rate of change of data in the transaction logs. In some implementations, the portions of the time period can be predetermined, such that classifications are applied to predetermined portions of the time period. In an example, Monday afternoon can be classified based on the classifications of rates of change in the data in the transaction logs in Monday afternoon. In some implementations, the portions of the time period are determined based on the classifications of rates of change of data in the transaction logs. In an example, a portion of Monday afternoon is determined based on Monday afternoon having a single classification for rates of change of data in the transaction logs. In an example, a portion of Tuesday evening through Wednesday afternoon is determined based on similar classifications for rates of change of data in the transaction logs in Tuesday evening through Wednesday afternoon. The classification of the portions can include indications of SLAs for the portions. The SLAs for the portions can be based on SLAs included in the classifications of rates of change of data in the transaction logs and/or can be determined based on the rates of change of data in the transaction logs, as discussed herein. An example of classifications of portions of the time period is illustrated in FIG. 5.

At operation 370, an SLA data structure is generated based on the classification of portions. The SLA data structure may include the portions and SLAs associated with the portions. In an example, the SLA data structure includes indications of the portions and corresponding SLAs to be applied in the portions. The SLA data structure may include the SLAs associated with the portions and indications of frequency and/or occurrence that correspond to the portions. In an example, the SLA data structure includes SLAs defining frequencies of snapshot and/or transaction collection operations as well as a number of repetitions of the SLAs such that the SLAs occur during the corresponding portions. The SLA data structure may include start times of portions and SLAs that occur within the portions. In an example, the SLA data structure includes a first start time of a first portion and an indication of a first SLA to be applied during the first portion and a second start time of a second portion and an indication of a second SLA to be applied during the second portion. In this example, the SLA data structure can include an indication of a number of repetitions of the first SLA within the first portion and an indication of a number of repetitions of the second SLA within the second portion. Defining the number of repetitions of the SLAs may define the portions, as the duration of the first SLA corresponds to the duration of the first portion and the duration of the second SLA corresponds to the duration of the second portion.

An example of an SLA data structure is as follows:
adaptiveSLA: [
{start_time: "1:00",
interval: "60", #minutes
repeat: "6" #times
},
{start_time: "6:30",
interval: "30", #minutes
repeat: "4" #times
}, {start_time: "8:15",
interval: "15", #minutes
repeat: "8" #times
},
{start_time: "10:05",
interval: "5", #minutes
repeat: "24" #times
},
{start_time: "12:30",
interval: "30", #minutes
repeat: "4" #times
},
{start_time: "14:05",
interval: "5", #minutes
repeat: "36" #times
},
{start_time: "17:15",
interval: "15", #minutes
repeat: "12" #times
},
{start_time: "20:04",
interval: "5", #minutes
repeat: "24" #times
},
{start_time: "22:30",
interval: "30", #minutes
repeat: "4" #times
}, In this example SLA data structure, each bracketed portion having a "start_time" may be a portion, while the duration of the portion is defined within the SLA data structure by the interval, (i.e., interval between log collection operations, SLA) and the number of repetitions of the interval (i.e., of the SLA).

At operation 380, the SLAs defined in the SLA data structure are executed. The SLA data structure may be executed (SLAs defined in the SLA data structure are executed) by a VM or a container where the database is located. In some implementations, the SLA data structure is executed by an agent of the control plane 210 of FIG. 2. In this way, the VM or container where the database is located can execute the SLA data structure without additional input from the control plane 210, avoiding placing an additional burden on the VM or container. In this way, a compute burden of evaluating compliance with the RDO can be avoided, which can be particularly important during peak activity times of the database.

In some implementations, the method 300 includes monitoring compliance with the RDO. The SLA data structure can represent a prediction of rates of change in the transaction logs for future time periods based on rates of change in the transaction logs for past time periods. The SLA data structure can be updated based on deviations of the rate of change of data in the transaction logs from the prediction. The SLA data structure can be updated based on determinations of rates of change of data in the transaction logs in subsequent time periods. In some implementations, SLAs can be implemented to maintain compliance with the RDO despite what is defined in the SLA data structure. In an example, during a period of unexpectedly high activity, an SLA with a higher frequency of transaction log collections operations than defined in the SLA data structure may be implemented to maintain compliance with the RDO. In this example, the control plane 210 of FIG. 2 may monitor the rate of change of data in the transaction logs to determine when to implement SLAs other than the SLAs defined in the SLA data structure. The control plane 210 may determine that a different SLA is needed based on a start time of a log collection operation being delayed, such as due to a previous log collection operation taking more time than expected.

The prediction of rates of change in the transaction logs in the SLA data structure can be refined and updated for each subsequent time period. The prediction of rates of change in the transaction logs can be refined and updated based on seasonal trends, application usage trends, and other factors affecting database usage. In an example, the SLA data structure can be updated to reflect expected holiday activity levels. In an example, the SLA data structure can be updated to reflect expected user numbers of an application using the database.

FIG. 4 illustrates a table 400 including example classifications of rates of change of data in transaction logs. The table 400 includes zones 410, or classifications of rates of change, measurements 420 of rates of change of data in the transaction logs, and SLA 430. The zones 410 may include indications of levels of activity corresponding to the measurements 420. The measurements 420 of the rates of change of the data in the transaction logs may be in terms of numbers of time intervals required to reach or exceed a predetermined RDO, such as numbers of five-minute time intervals required to reach or exceed the RDO. The measurements 420 of rates of change of data in the transaction logs can be depicted in terms of numbers of time intervals required to reach or exceed the RDO to provide comparison to the SLAs 430. The SLAs 430 may indicate a frequency of backup operations, such as log collection operations. The zones 410, the measurements 420, and the SLAs correspond to each other such that a measurement of the rate of change of data in the transaction logs of the measurements 420 is classified using a zone of the zones 410 and a corresponding SLA of the SLAs 430 is assigned to the zone 410 to comply with the RDO. The measurements 420 can include ranges of measurements that correspond to the zones 410. In an example, a zone of "low activity" corresponds to a rate of change of data in the transaction logs of more than six five-minute intervals, but less than twelve five-minute intervals to reach the RDO, corresponding to an SLA where transaction log collection operations are executed every hour. In this example, executing the transaction log collection operations every hour ensures compliance with the RDO, as the amount of data of the RDO is only reached during the zone between six and twelve five-minute time intervals, or between thirty and sixty minutes. In some implementations, the number of times the RDO is reached within a portion of the time period is the same as the number of times logs should be collected within the portion of the time period. In an example, the number of times the RDO is reached within a five-minute interval is the number of times the logs should be collected within the five-minute time interval. In this way, the log collection operations each collect an amount of data similar in size to the RDO, reducing unexpected burden on the control plane or database server. In an example, the number of times the RDO is reached within the "low activity" zone is once per hour and so the SLA of one-hour frequency is selected such that the log collection operation is conducted once per hour. In an example, the number of five-minute intervals for the amount of data of the RDO to be reached within the "moderate activity zone" is two to three (ten to fifteen minutes), so the SLA of fifteen-minute frequency is selected such that the log collection operation is conducted every fifteen minutes. In this example, the amount of data of the RDO is reached no more than twice every fifteen minutes. In this way, the SLA is determined such that the log collection operation transfers an amount of data that is at least as large as the RDO but no larger than two times the RDO. In this way, the minimum amount of data (e.g., the RDO) is transferred in each log collection operation, and overly-large amounts of data for the log collection operation are avoided.

FIG. 5 illustrates an example SLA data structure 500 for adaptive SLAs. The SLA data structure 500 may be generated using data from the table 400 of FIG. 4. The SLA data structure 500 includes zones 510, SLAs 520, portions of a time period 530, and numbers of repetitions 540 of the SLAs 520. The SLA data structure 500 is an SLA data structure for a day, generated based on observed rates of change of data of transaction logs in a day. The zones 510 may be the zones 410 of FIG. 4, corresponding to the SLAs 520, which are the zones 410 of FIG. 4. The zones 510 correspond to the portions of the time period 530 such that the SLAs 520 corresponding to the zones 510 are associated with the portions of the time period 530. The numbers of repetitions 540 of the SLAs 520 indicate how many times the SLAs 520 are repeated within the portions of the time period 530. In some implementations, the number of repetitions 540 of the SLAs 520 are used to determine which SLA should be executed. In some implementations, the portions of the time period 530 are used to determine which SLA should be executed. Thus, the SLA of the SLAs 520 to be executed can be determined without monitoring current activity on the database, preventing placing a computational burden on the database and improving functioning of the database.

FIG. 6 is a flow diagram illustrating operations of a method 600 for generating a data structure for adaptive SLAs. The method 600 may include more, fewer, or different operations than illustrated. The operations may be performed in the order shown, in a different order, and/or concurrently. The method 600 may be performed by the database management system 200 of FIG. 2. The method 600 may be performed by the control plane 210 and/or the backup service 212 of FIG. 2.

At operation 610, transaction logs of a database server are obtained that were captured in a predetermined time period. Capturing the transaction logs can include logging transactions at the database server as they are executed, where logging the transactions includes storing the transaction logs at the database server. The transaction logs can be periodically transferred from the database server to a staging location, such as a staging disk of an agent of a control plane executed at the database server. Obtaining the transaction logs can include receiving the transaction logs from the staging location at the control plane. The agent of the control plane executed at the database server can periodically transmit the transaction logs to the control plane as part of a log collection operation, as discussed herein.

The predetermined time period may be a time period for analysis of the transaction logs. The predetermined time period may be used to predict transaction log activity, or data changed in the transaction logs (and in the database) at different portions of the time period. In an example, the predetermined time period is a day, and transaction log activity (timing and size of transaction logs) in the day can be used to predict transaction log activity in subsequent days. In an example, the predetermined time period is a week, and transaction log activity in the week can be used to predict transaction log activity in subsequent weeks. In an example, the predetermined time period is a year, and transaction log activity in the year can be used to predict transaction log activity in subsequent years.

At operation 620, a rate of change of data within the transaction logs is identified. The rate of change of data within the transaction logs corresponds to a rate of change of data within the database, as the transaction logs reflect database transactions (changes to data) in the database. By identifying the rate of change of data within the transaction logs, an amount of data that is changed during portions of the time period can be determined. In some implementations, identifying the rate of change of data within the transaction logs includes identifying a frequency of the transaction logs and a size of the transaction logs. In an example, a frequency of transaction logs and a size of the transaction logs for each fifteen minutes are determined to determine an amount of data changed in each fifteen minutes.

At operation 630, portions of the time period are classified according to the rate of change of data within the portions of the time period. In some implementations, classifying the portions of the time period includes classifying different rates of change of data in the transaction logs, correlating the rates of change of data in the transaction logs with the portions of the time period, and classifying the portions of the time period according to the classifications of the rates of change of data in the transaction logs. In an example, a high rate of change of data in the transaction logs is classified as "moderate activity," and portions of the time period having the high rate of change of data in the transaction logs are classified as moderate activity times.

In some implementations, classifying the portions of the time period is based on a number of times an amount of data of an RDO is changed within the database within the portions of the time period. The amount of data changed within the database is reflected in the transaction logs. The number of times the amount of data of the RDO is changed can be determined based on the amount of data of changed in the transaction logs. In some implementations, classifying the portions of the time period is based on a number of consecutive time intervals of predetermined duration (e.g., five minutes) need to reach or exceed the amount of data of the RDO. In some implementations, classifying the portions of the time period includes identifying contiguous portions of the time period having similar rates of change of data. In an example, the portions of the time period can have predetermined duration and can each be classified separately based on their average rate of change of data or their peak rate of change of data. In an example, the portions of the time period are defined based on identifying contiguous portions of the time period having similar rates of change of data. In this example, identifying contiguous portions of the time period may include identifying contiguous portions of the time period having a variance in rates of change of data in the transaction logs below a predetermined threshold.

At operation 640, a service level agreement (SLA) is set for each portion of the time period according to the classification of each portion. In some implementations, the method 600 includes determining a corresponding SLA for each classification of the portions of the time period. Determining the corresponding SLA for each classification of the portions of the time period may include determining a frequency of log collection operations during the portions of the time period based on an RDO (to comply with the RDO). In some implementations, determining the SLA for each classification of the portions of the time period includes determining a number of consecutive time intervals of predetermined duration to reach or exceed an amount of data defined in the RDO. In an example, between three and six five-minute intervals are required to reach or exceed an amount of data of an RDO at a rate of change of data in the transaction logs, resulting in a classification of the rate of change of data in the transaction logs as "medium activity."

In order to comply with the RDO, an SLA with log collection operations every thirty minutes is determined for the medium activity classification. In this way, each log collection operation transfers an amount of data roughly equal to the amount of the RDO, and at most twice the amount of the RDO. In this way, unexpectedly large amounts of data transferred in a log collection operation are avoided, improving system performance.

In some implementations, the method 600 includes requesting the RDO from a user. Requesting the RDO from the user may include indicating that the RDO defines a maximum amount of data that can be lost during a failure, where the RDO is translated into time-based SLAs based on database activity as reflected in database transaction logs, or predictions of database activity based on database transaction logs.

In some implementations, the method 600 includes executing the SLAs in a subsequent time period. Executing the SLAs may include generating an SLA data structure including the SLAs and indications of when the SLAs are to be executed. The SLA data structure may be implemented during the subsequent time period such that the SLAs adapt to the prediction of database activity represented in the SLA data structure. In this way, an adaptive SLA schedule can be implemented without imposing additional burden on the workload for monitoring database activity and/or determining an SLA to be applied. Executing the SLAs may include transmitting the SLA data structure to an agent of a control plane executed on a database server of the database for the agent to implement in the subsequent time period.

In some implementations, the method 600 includes refining the predictions of database activity based on database activity in the subsequent time period to have more accurate predictions of database activity in additional subsequent time periods. In some implementations, the method 600 includes obtaining transaction logs for the subsequent time period, reclassifying the portions of the subsequent time period, and setting a new SLA for each portion of the subsequent time period according to the reclassification of each portion. In some implementations, only portions of the time period with new classifications have a new SLA set for future time periods. In an example, an SLA for Friday afternoon is set based on transaction logs captured on a first Friday afternoon and updated based on transaction logs captured on a second, subsequent Friday afternoon. In some implementations, the SLAs for the portions are updated by determining compliance with the RDO to determine whether the SLAs were sufficient to comply with the RDO. In an example, portions where the RDO was breached are updated to have an SLA with a higher frequency of transaction collection operations.

In some implementations, the method 600 includes capture snapshots of the database within the time period, where the transaction logs can be applied to the snapshots of the database for point-in-time-recover (PITR) of the database server. The SLAs for the portions of the time period can include snapshot operations and transaction log collection operations. The SLAs can include combinations of snapshot operations and transaction log collection operations to comply with the RDO. Different combinations of snapshot operations and transaction log collection operations can be used to comply with the same RDO. The more transaction logs to be applied to a database clone from a snapshot, the longer the transaction log application operation may take. Thus, the snapshot operations and transaction log collection operations may be optimized for the database server to provide coverage for the database server according to user input, such as the RDO.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:

obtaining, by one or more processors, transaction logs of a database server captured in a predetermined time period;

identifying, by the one or more processors, a rate of change of data within the transaction logs captured in the predetermined time period;

classifying, by the one or more processors, portions of the time period according to the rate of change of data within the portions of the time period; and dynamically setting, by the one or more processors, a service level agreement (SLA) for each portion of the time period according to the classification of each portion and the rate of change of data within the portions of the time period.

2. The method of claim 1, further comprising determining, by the one or more processors, a corresponding SLA for each classification of the portions of the time period.

3. The method of claim 1, further comprising executing, by the one or more processors, the SLAs in a subsequent time period.

4. The method of claim 1, further comprising requesting, by the one or more processors, a recovery data objective (RDO) from a user, wherein setting the SLA for each portion of the time period is based on the RDO.

5. The method of claim 1, wherein identifying, by the one or more processors, the rate of change of data within the transaction logs includes identifying a frequency of the transaction logs and a size of the transaction logs.

6. The method of claim 1, wherein classifying, by the one or more processors, the portions of the time period is based on a number of times an amount of data of a recovery data objective (RDO) is changed within the portions of the time period.

7. The method of claim 1, wherein classifying, by the one or more processors, the portions of the time period includes identifying contiguous portions of the time period having similar rates of change of data.

8. The method of claim 1, further comprising:
obtaining, by the one or more processors, transaction logs for a subsequent time period,
reclassifying, by the one or more processors, the portions of the subsequent time period; and
setting, by the one or more processors, a new SLA for each portion of the subsequent time period according to the reclassification of each portion.

9. The method of claim 1, further comprising capturing, by the one or more processors, snapshots of the database within the time period, wherein the transaction logs can be applied to the snapshots of the database for point-in-time-recovery of the database server.

10. The method of claim 1, wherein setting, by the one or more processors, the SLA for each portion of the time period includes generating a data structure for the time period indicating the SLA for each portion of the time period.

11. An apparatus, comprising:
one or more processors; and
a non-transitory, computer-readable medium including instructions which, when executed by the one or more processors, cause the one or more processors to:
obtain transaction logs of a database server captured in a predetermined time period;
identify a rate of change of data within the transaction logs captured in the predetermined time period;
classify portions of the time period according to the rate of change of data within the portions of the time period; and
dynamically set a service level agreement (SLA) for each portion of the time period according to the classification of each portion and the rate of change of data within the portions of the time period.

12. The apparatus of claim 11, wherein the instructions cause the one or more processors to determine a corresponding SLA for each classification of the portions of the time period.

13. The apparatus of claim 11, wherein the instructions cause the one or more processors to execute the SLAs in a subsequent time period.

14. The apparatus of claim 11, wherein the instructions cause the one or more processors to request a recovery data objective (RDO) from a user, wherein setting the SLA for each portion of the time period is based on the RDO.

15. The apparatus of claim 11, wherein the instructions cause the one or more processors to identify the rate of change of data within the transaction logs by identifying a frequency of the transaction logs and a size of the transaction logs.

16. The apparatus of claim 11, wherein the instructions cause the one or more processors to classify the portions of the time period based on a number of times an amount of data of a recovery data objective (RDO) is changed within the portions of the time period.

17. The apparatus of claim 11, wherein the instructions cause the one or more processors to classify the portions of the time period by identifying contiguous portions of the time period having similar rates of change of data.

18. The apparatus of claim 11, wherein the instructions cause the one or more processors to:
obtain transaction logs for a subsequent time period,
reclassify the portions of the subsequent time period; and
set a new SLA for each portion of the subsequent time period according to the reclassification of each portion.

19. The apparatus of claim 11, wherein the instructions cause the one or more processors to capture snapshots of the database within the time period, wherein the transaction logs can be applied to the snapshots of the database for point-in-time-recovery of the database server.

20. The apparatus of claim 11, wherein the instructions cause the one or more processors to set the SLA for each portion of the time period by generating a data structure for the time period indicating the SLA for each portion of the time period.

21. The method of claim 1, further comprising automatically determining the rate of change from transaction logs and segmenting the time period accordingly.

22. The method of claim 1, further comprising dynamically assigning SLAs based on classified data change intervals.

23. The method of claim 1, wherein the database server is hosted on a node of a hyperconverged cluster comprising:
a plurality of nodes each including at least one database virtual machine (VM), a hypervisor, and a controller/service VM; and
a distributed storage pool accessible via a network, wherein the obtaining of transaction logs comprises retrieving the transaction logs from the database VM through the controller/service VM of the node.

24. The method of claim 1, wherein the hyperconverged cluster comprises direct-attached storage within each node and network-attached storage accessible to all nodes, and wherein setting the service level agreement (SLA) further comprises allocating backup storage in the distributed storage pool according to the classified portions of the time period.

25. The apparatus of claim 11, wherein the database server is a virtual machine executing on a node of a hyperconverged cluster, each node comprising a hypervisor, at least one database virtual machine, a controller VM, and direct-attached storage, with the nodes coupled via a network to a distributed storage pool.

26. The apparatus of claim 11, wherein the instructions are further configured to obtain transaction logs from the database virtual machine via the controller VM of the node on which the database virtual machine is hosted.

\* \* \* \* \*